（12） United States Patent
Odani

(10) Patent No.: US 11,709,100 B2
(45) Date of Patent: Jul. 25, 2023

(54) SENSOR UNIT AND IMAGE PROCESSING DEVICE

(71) Applicant: TOSHIBA TEC KABUSHIKI KAISHA, Tokyo (JP)

(72) Inventor: Makoto Odani, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 293 days.

(21) Appl. No.: 17/122,668

(22) Filed: Dec. 15, 2020

(65) Prior Publication Data

US 2021/0389187 A1 Dec. 16, 2021

(30) Foreign Application Priority Data

Jun. 11, 2020 (JP) ................................ 2020-101684

(51) Int. Cl.
*G01J 5/04* (2006.01)
*G01J 5/08* (2022.01)
(Continued)

(52) U.S. Cl.
CPC ............. *G01J 5/047* (2013.01); *G01J 5/0025* (2013.01); *G01J 5/0205* (2013.01); *G01J 5/07* (2022.01); *G01J 5/0806* (2013.01); *G01J 5/0856* (2013.01); *G01J 5/34* (2013.01); *G02B 3/0037* (2013.01); *G02B 5/005* (2013.01);
(Continued)

(58) Field of Classification Search
CPC ........ G01J 5/0025; G01J 5/0205; G01J 5/047; G01J 5/07; G01J 5/0806; G01J 5/0856; G01J 5/34; G01J 2005/0077; G02B 3/0037; G02B 5/005; G03G 15/5004; G06F 1/3231; G06F 1/3284; H04N 1/00037; H04N 1/00082; H04N 1/00251; H04N 1/00381; H04N 1/00896; H04N 1/04; H04N 5/2252; H04N 5/2253; H04N 5/2254; H04N 5/2257; H04N 2201/0094; Y02D 10/00
See application file for complete search history.

(56) References Cited

U.S. PATENT DOCUMENTS 10,088,366 B2 * 10/2018 Harano .................... G02B 3/00
2012/0127518 A1 5/2012 Ogata et al.
(Continued)

FOREIGN PATENT DOCUMENTS

EP 1 847 822 A1 10/2007
JP H06-242226 A 9/1994
(Continued)

OTHER PUBLICATIONS

Extended European Search Report dated Jul. 30, 2021 issued in corresponding EP Application No. 21157861.2, 11 pages.

*Primary Examiner* — Mark R Gaworecki
(74) *Attorney, Agent, or Firm* — Foley & Lardner LLP

(57) ABSTRACT

A sensor apparatus includes a photosensitive sensor, a cover, and a moving mechanism. The photosensitive sensor includes a first lens and a second lens which focus on a photosensitive element. The cover includes a first slit arranged on an optical axis of the first lens and a second slit arranged on an optical axis of the second lens. The moving mechanism is configured to move the photosensitive sensor and the cover relative to each other so that the second slit is arranged on the optical axis of the first lens.

13 Claims, 9 Drawing Sheets

(51) Int. Cl.
*G01J 5/00* (2022.01)
*G01J 5/34* (2022.01)
*G01J 5/07* (2022.01)
*G01J 5/02* (2022.01)
*G02B 3/00* (2006.01)
*G02B 5/00* (2006.01)
*H04N 1/00* (2006.01)
*G06F 1/32* (2019.01)
*G03G 15/00* (2006.01)
*G01J 5/0806* (2022.01)
*G06F 1/3234* (2019.01)
*G06F 1/3231* (2019.01)
*H04N 1/04* (2006.01)
*H04N 23/51* (2023.01)
*H04N 23/55* (2023.01)
*H04N 23/54* (2023.01)
*H04N 23/57* (2023.01)

(52) U.S. Cl.
CPC ....... *G03G 15/5004* (2013.01); *G06F 1/3231* (2013.01); *G06F 1/3284* (2013.01); *H04N 1/00037* (2013.01); *H04N 1/00082* (2013.01); *H04N 1/00896* (2013.01); *H04N 1/04* (2013.01); *H04N 23/51* (2023.01); *H04N 23/55* (2023.01); *G01J 2005/0077* (2013.01); *H04N 1/00251* (2013.01); *H04N 1/00381* (2013.01); *H04N 23/54* (2023.01); *H04N 23/57* (2023.01); *H04N 2201/0094* (2013.01); *Y02D 10/00* (2018.01)

(56) References Cited

U.S. PATENT DOCUMENTS

| | | | |
|---|---|---|---|
| 2013/0300198 A1* | 11/2013 | Yamashina | H02J 9/005 |
| | | | 307/39 |
| 2017/0094069 A1 | 3/2017 | Kanemitsu et al. | |
| 2019/0235603 A1 | 8/2019 | Murata | |

FOREIGN PATENT DOCUMENTS

| | | |
|---|---|---|
| JP | 2001-272274 A | 10/2001 |
| JP | 2013-254004 A | 12/2013 |
| JP | 6471966 B2 | 2/2019 |

\* cited by examiner

SENSOR UNIT AND IMAGE PROCESSING DEVICE

CROSS-REFERENCE TO RELATED APPLICATION

This application is based upon and claims the benefit of priority from Japanese Patent Application No. 2020-101684, filed on Jun. 11, 2020, the entire contents of which are incorporated herein by reference.

FIELD

Embodiments described herein relate generally to sensor units and image processing devices.

BACKGROUND

As an image processing device, an image forming device which forms an image on a sheet is used. The image forming device includes a sensor unit (apparatus) which detects a presence of a person. The sensor unit is required to prevent a decrease in detection sensitivity. The sensor unit is required to be able to adjust a detection range.

DETAILED DESCRIPTION

An object to be solved by an exemplary embodiment is to provide a sensor unit (apparatus) and an image processing device (processor) capable of preventing a decrease in detection sensitivity and adjusting a detection range.

A sensor unit of at least one embodiment includes a photosensitive sensor, a cover, and a moving mechanism. The photosensitive sensor includes a first lens and a second lens which focus on a photosensitive element. The cover includes a first slit arranged on an optical axis of the first lens and a second slit arranged on an optical axis of the second lens. The moving mechanism is configured to move the photosensitive sensor and the cover relative to each other so that the second slit is arranged on the optical axis of the first lens.

Hereinafter, a sensor unit and an image processing device of at least one embodiment will be described with reference to the drawings.

Figure 1:
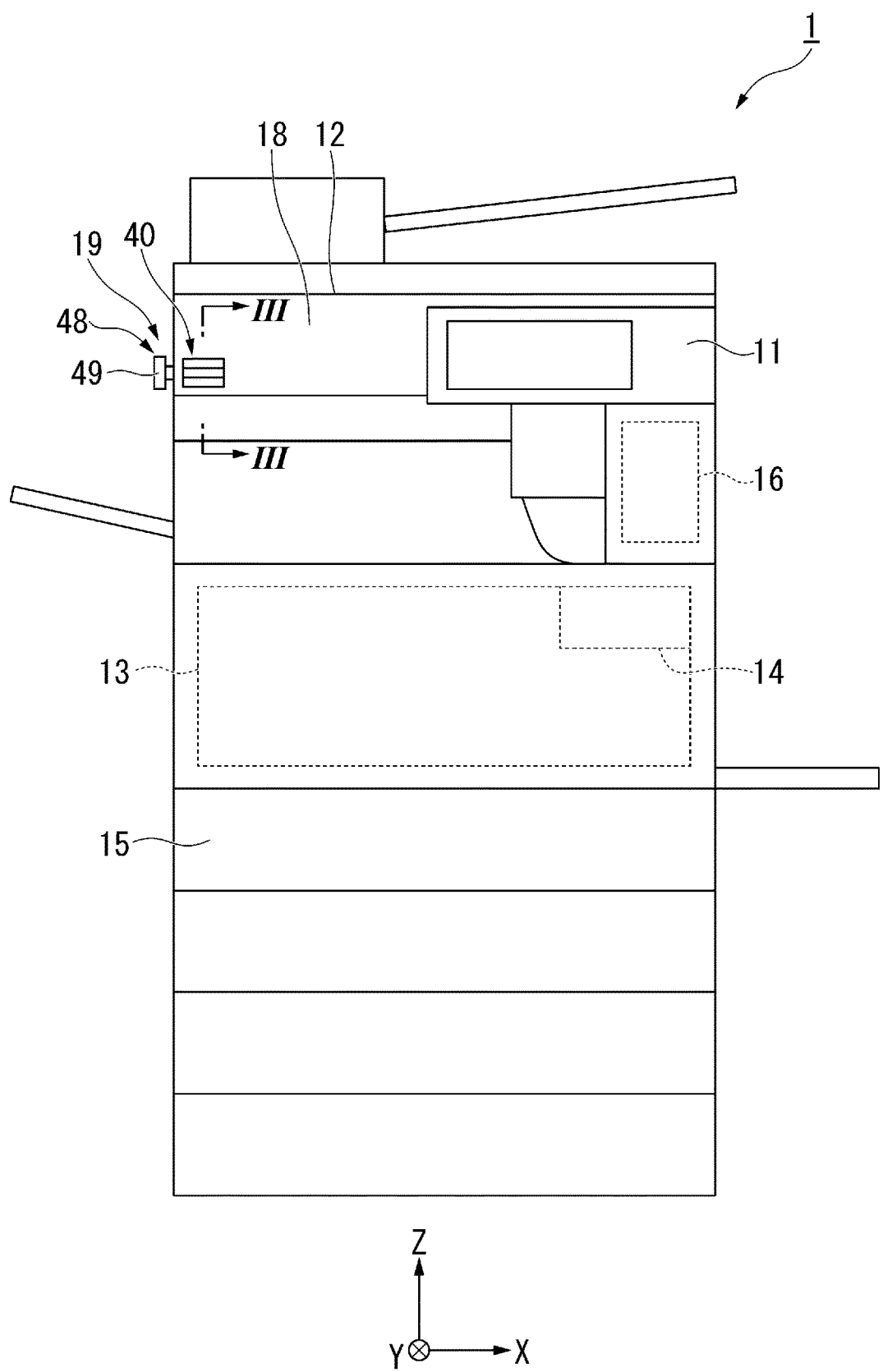
FIG. 1 is a front view of an image processing device of at least one embodiment.

FIG. 1 is a front view of the image processing device of at least one embodiment. In the present application, a Z direction, an X direction, and a Y direction of the Cartesian coordinate system are defined as follows. The Z direction is a vertical direction and a +Z direction is an upward direction. The X and Y directions are horizontal. The X direction is a width direction of an image forming device. A +X direction is to aright direction with respect to the image forming device. The Y direction is a depth direction of the image forming device. The +Y direction is a direction from the front to the back of the image forming device. A θ direction is a circumferential direction in the X direction. A +θ direction is a rotation direction of a right-hand screw traveling in the X direction.

The image processing device of at least one embodiment is an image forming device 1. The image forming device 1 performs a process of forming an image on a sheet. The sheet may be paper. The image forming device 1 includes a control panel 11, a scanner portion 12, an image processing unit, a sheet supply portion 15, and a controller 16.

The control panel 11 includes an operation unit and a display portion. The operation unit is provided with various keys, a touch panel, and the like, and accepts user operations. The display portion displays various types of information.

The scanner portion 12 reads image information of an object to be copied based on brightness and darkness of light and generates an image signal.

The image processing unit of at least one embodiment may be an image forming unit 13. The image forming unit 13 forms a toner image based on an image signal from the scanner portion 12 or the outside. A toner image is an image formed of toner or other material. The image forming unit 13 transfers the toner image onto the surface of the sheet. The image forming unit 13 includes a fixing device 14. The fixing device 14 heats and pressurizes the toner image transferred to the sheet to fix the toner image on the sheet.

The sheet supply unit 15 supplies the sheets one by one to the image forming unit 13 at the timing at which the image forming unit 13 forms the toner image.

Figure 2:
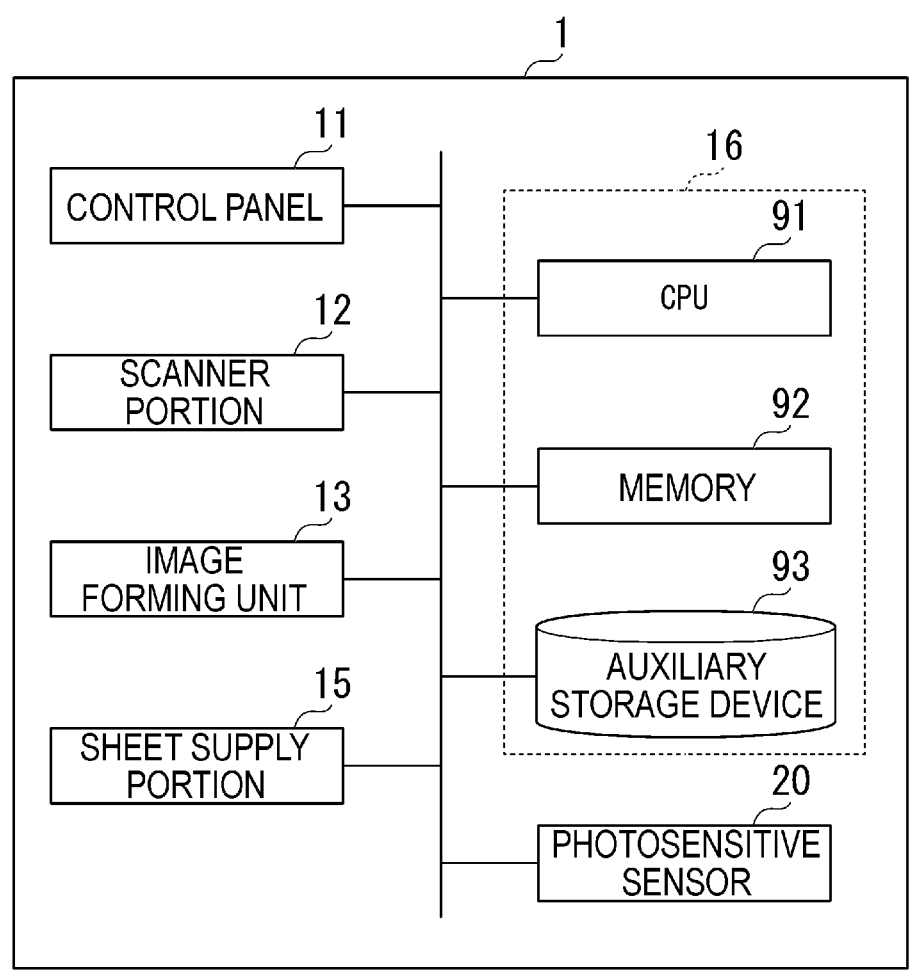
FIG. 2 is a block diagram of the image processing device according to at least one embodiment.

FIG. 2 is a block diagram of the image processing device.

The image forming device 1 includes a central processing unit (CPU) 91, a memory 92, an auxiliary storage device 93, and the like connected by a bus, and executes a program. The image forming device 1 functions as a device including the control panel 11, the scanner unit 12, the image forming unit 13, the sheet supply unit 15, and the like by executing a program.

The CPU 91 functions as the controller 16 by executing a program stored in the memory 92 and the auxiliary storage device 93. The controller 16 controls the operation of each functional unit of the image forming device 1.

The auxiliary storage device 93 is configured by using a storage device such as a magnetic hard disk device or a semiconductor storage device. The auxiliary storage device 93 stores information.

A sensor unit (apparatus) 19 will be described.

The image forming device 1 includes the sensor unit 19 illustrated in FIG. 1. The sensor unit 19 is located at a predetermined height in the +Z direction from the floor surface. For example, the sensor unit 19 is located at the corners of the image forming device in the −X direction and the −Y direction. The sensor unit 19 detects a person existing in a vicinity of the image forming device 1.

Figure 3:
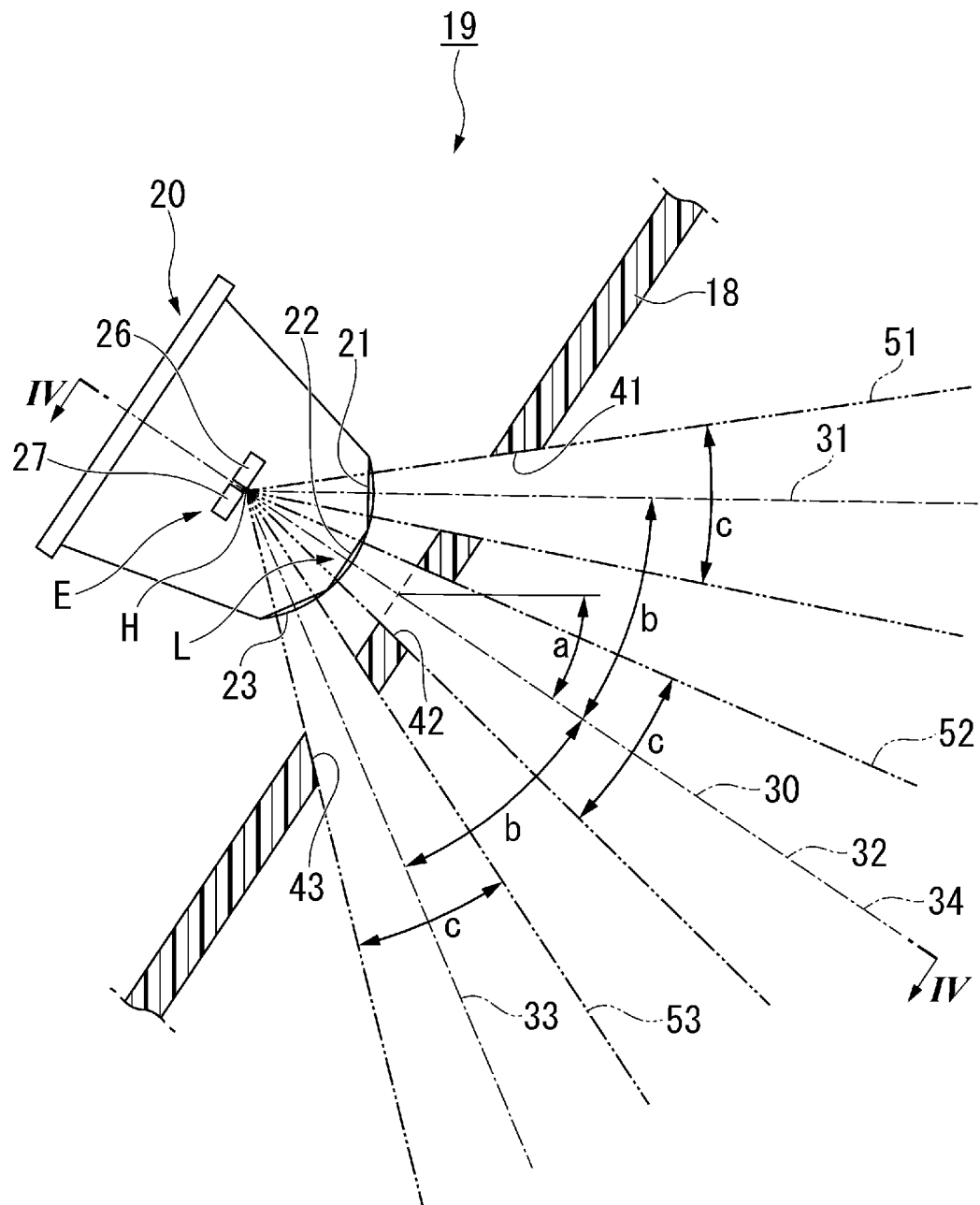
FIG. 3 is a side cross-sectional view of a first state of a sensor unit (apparatus) according to at least one embodiment.

FIG. 3 illustrates a first state of the sensor unit of the embodiment and is a side cross-sectional view taken along the line III-III of FIG. 1. The sensor unit 19 includes a photosensitive sensor 20 illustrated in FIG. 3, a cover 18, and a moving mechanism 48 illustrated in FIG. 1.

The photosensitive sensor 20 includes a photosensitive unit E and a lens unit L illustrated in FIG. 3.

The photosensitive unit E detects light rays. The photosensitive unit E includes a plurality of photosensitive elements 26 and 27. The plurality of photosensitive elements 26 and 27 are arranged side by side in a plane perpendicular to an optical axis 30 of the photosensitive sensor 20. The photosensitive sensor 20 may be a pyroelectric sensor. The pyroelectric sensor includes pyroelectric elements as the photosensitive elements 26 and 27. The pyroelectric element uses the pyroelectric effect to detect infrared rays emitted by a person. The pyroelectric effect is a phenomenon in which the electric charge of a ferroelectric substance increases or decreases due to a temperature change caused by infrared rays. If the photosensitive unit E detects light rays, the photosensitive unit E outputs a detection signal.

The lens unit L focuses the incident light rays on the photosensitive unit E. The lens unit L collects the incident light rays on the photosensitive unit E. The lens unit L includes a plurality of lenses 21, 22, and 23. The plurality of lenses 21, 22, and 23 are the first lens 21, the second lens 22, and the third lens 23. The plurality of lenses 21, 22, and 23 may be arranged side by side in a circumferential direction of a horizontal axis H. The horizontal axis H is parallel to the X direction and passes through the surface of the photosensitive unit E. The first lens 21, the second lens 22, and the third lens 23 are arranged side by side in this order from the +Z direction to the −Z direction.

The optical axis 30 of the photosensitive sensor 20 is orthogonal to the X direction and intersects the horizontal axis H. In the first state of the sensor unit 19 illustrated in FIG. 3, the optical axis 30 of the photosensitive sensor 20 is inclined by an angle a from the −Y direction to the +θ direction. Optical axes 31, 32, and 33 of the plurality of lenses 21, 22, and 23 are orthogonal to the X direction and intersect the horizontal axis H. The second optical axis 32 of the second lens 22 coincides with the optical axis 30 of the photosensitive sensor 20. The first optical axis 31 of the first lens 21 is inclined by an angle b in the −θ direction from the second optical axis 32. The third optical axis 33 of the third lens 23 is inclined by the angle b in the +θ direction from the second optical axis 32. The angle a and the angle b are the same. In the first state of the sensor unit 19 illustrated in FIG. 3, the first optical axis 31 is parallel to the Y direction.

The moving mechanism 48 illustrated in FIG. 1 pivotably supports the photosensitive sensor 20 around the horizontal axis H. The moving mechanism 48 includes a lever 49. The lever 49 is exposed to the outside of the image forming device 1. The lever 49 is connected to the photosensitive sensor 20. If the lever 49 pivots in the θ direction, the photosensitive sensor 20 pivots in the θ direction. The moving mechanism 48 is configured to pivot the photosensitive sensor 20 around the horizontal axis H.

The cover 18 is located between the outside of the image forming device 1 and the photosensitive sensor 20 illustrated in FIG. 3. The cover 18 prevents the action of an external force on the photosensitive sensor 20 and protects the photosensitive sensor 20. The cover 18 is a part of the housing of the image forming device 1. The cover 18 may have a flat plate shape and is parallel to the X direction. A normal line 34 on the surface of the cover 18 is inclined by the angle a from the −Y direction to the +θ direction. In the first state of the sensor unit 19 illustrated in FIG. 3, the optical axis 30 of the photosensitive sensor 20 coincides with the normal line 34 on the surface of the cover 18.

The cover 18 has a plurality of slits 41, 42, and 43. The plurality of slits 41, 42, and 43 penetrate the cover 18 in a thickness direction. The plurality of slits 41, 42, and 43 are long in the X direction and short in the Y direction. The plurality of slits 41, 42, and 43 are the first slit 41, the second slit 42, and the third slit 43. In the first state of the sensor unit 19 illustrated in FIG. 3, the plurality of slits 41, 42, and 43 are respectively located on the optical axes 31, 32, and 33 of the plurality of lenses 21, 22, and 23. The first slit 41 is located on the first optical axis 31. The second slit 42 is located on the second optical axis 32. The third slit 43 is located on the third optical axis 33. In other words, the optical axes 31, 32, and 33 of the plurality of lenses 21, 22, and 23 respectively pass through the plurality of slits 41, 42, and 43. The first optical axis 31 passes through the first slit 41. The second optical axis 32 passes through the second slit 42. The third optical axis 33 passes through the third slit 43.

Figure 4:
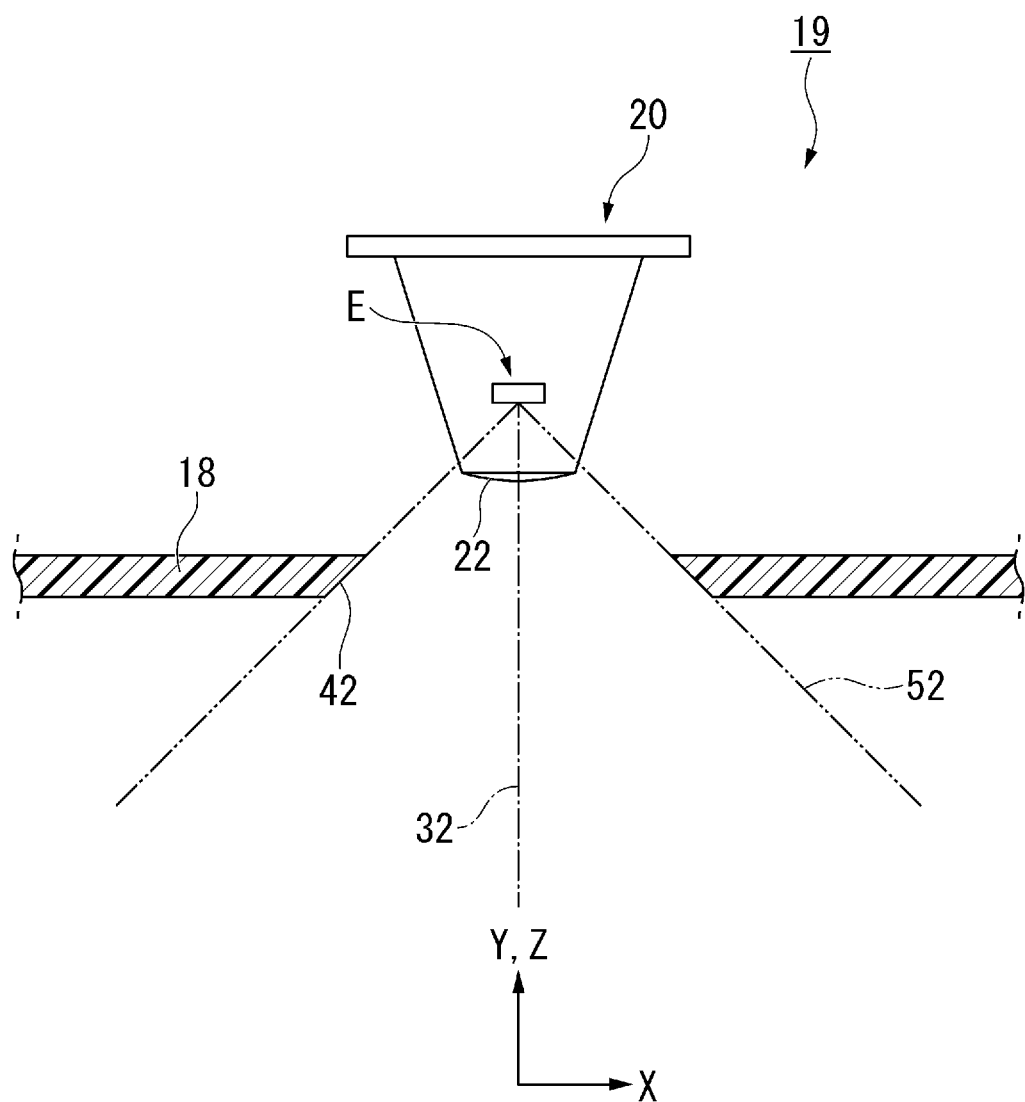
FIG. 4 is a cross-sectional view taken along the line IV-IV of FIG. 3.

FIG. 4 is a cross-sectional view taken along the line IV-IV of FIG. 3. As illustrated in FIGS. 3 and 4, the inner surfaces of the plurality of slits 41, 42, and 43 are formed along the ends of the angles of view of the plurality of lenses 21, 22, and 23 in the first state. In the first state, as illustrated in FIG. 3, the plurality of lenses 21, 22, and 23 are arranged so that the optical axes 31, 32, and 33 pass through the plurality of slits 41, 42, and 43. The ends of the angles of view of the plurality of lenses 21, 22, and 23 are the optical paths farthest from the optical axes 31, 32, and 33 among the optical paths of light rays incident on the photosensitive unit E through the plurality of lenses 21, 22, and 23.

The inner surface of the first slit 41 is formed along the end of the angle of view of the first lens 21 in the first state. The inner surface of the second slit 42 is formed along the end of the angle of view of the second lens 22 in the first state. The inner surface of the third slit 43 is formed along the end of the angle of view of the third lens 23 in the first state. The inner surfaces of the plurality of slits 41, 42, and 43 intersect at angles other than perpendicular to the surface of cover 18.

The plurality of slits 41, 42, and 43 do not limit the angles of view of the plurality of lenses 21, 22, and 23. The incident light rays on the photosensitive sensor 20 are not limited by the plurality of slits 41, 42, and 43. Such configuration prevents a decrease in the detection sensitivity of the photosensitive sensor 20. The set of optical paths of light rays incident on the photosensitive unit E through the plurality of lenses 21, 22, and 23 is the detection ranges 51, 52, and 53 by the plurality of lenses 21, 22, and 23. The plurality of slits 41, 42, and 43 do not limit the detection ranges 51, 52, and 53 by the plurality of lenses 21, 22, and 23.

Since the plurality of slits 41, 42, and 43 are elongated, human fingers may have difficulty in entering. Such a configuration prevents a decrease in detection sensitivity due to contamination of the photosensitive sensor 20. Since the plurality of slits 41, 42, and 43 are elongated, the action of an external force on the photosensitive sensor 20 is prevented. Such configuration improves the reliability of the photosensitive sensor 20.

Figure 5:
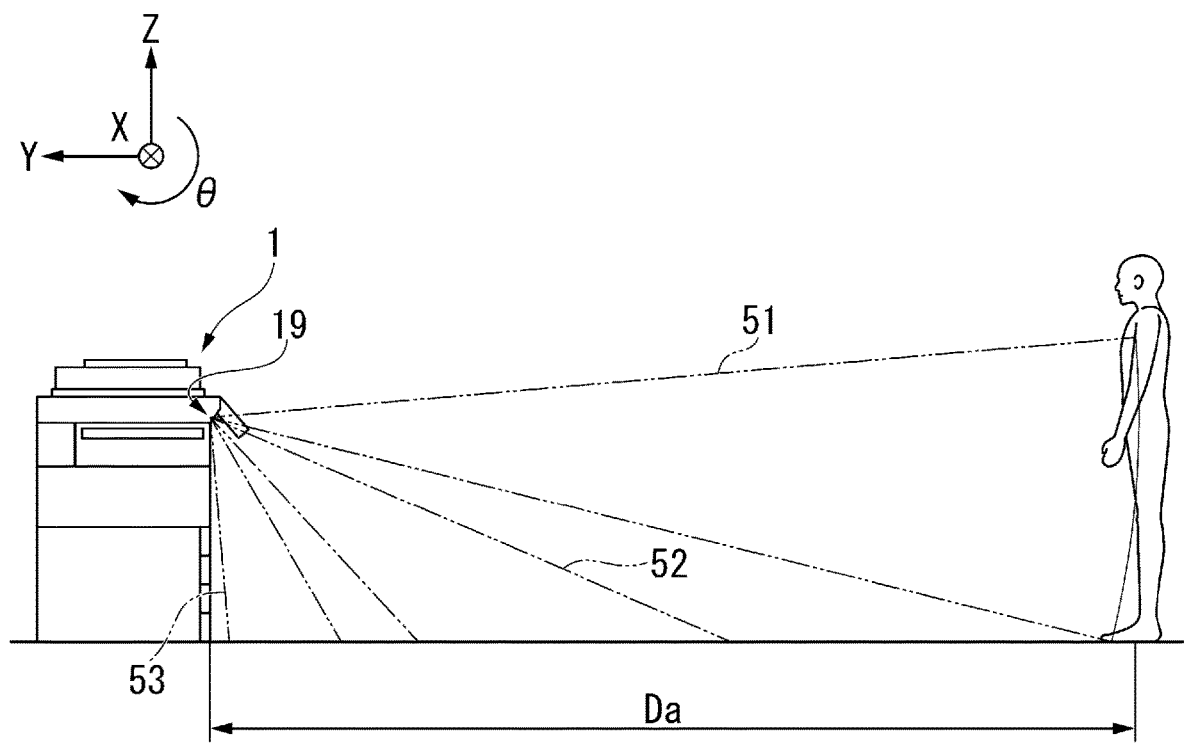
FIG. 5 is an explanatory diagram of a detection range of the sensor unit in the first state.

FIG. 5 is an explanatory diagram of the detection range of the sensor unit in the first state. The sensor unit 19 detects a person who is near the image forming device 1 as a person who may use the image forming device 1. The sensor unit 19 detects a person existing in the detection ranges 51, 52, and 53. In the first state, the first optical axis 31 is parallel to the Y direction. The first detection range 51 by the first lens 21 extends to infinity, but a first detection distance Da is determined by the detection sensitivity of the photosensitive unit E. The detection distance is the distance from the photosensitive sensor 20 within which the photosensitive sensor 20 can perform detection. If a person is within the range of the first detection distance Da, the photosensitive sensor 20 outputs a detection signal.

In the first state, the second optical axis 32 and the third optical axis 33 are inclined from the −Y direction to the +θ direction. The second detection range 52 by the second lens 22 and the third detection range 53 by the third lens 23 are finite ranges. The second detection range 52 and the third detection range 53 are closer to the image forming device 1 than the first detection range 51. The photosensitive sensor 20 also outputs a detection signal if a person is in the second detection range 52 or the third detection range 53.

As illustrated in FIG. 2, the photosensitive sensor 20 is connected to the bus. The controller 16 controls the power supplied to the image forming unit 13 based on the output signal of the photosensitive sensor 20. The power supply mode to the image forming unit 13 includes at least a normal mode and a power saving mode. In the normal mode, all power required for image formation is supplied. In the power saving mode, the power supplied to some devices including the fixing device 14 is restricted. Even in the power saving mode, power is supplied to the controller 16 and the photosensitive sensor 20. If the detection signal of the photosensitive sensor 20 is received in the power saving mode, the controller 16 switches the power supply mode to a higher normal mode. If the detection signal of the photosensitive sensor 20 is received in the normal mode state, the controller 16 postpones switching the power supply mode to a lower power saving mode. The power supply mode may be set to three or more stages.

In the first state illustrated in FIG. 5, since the first optical axis 31 is parallel to the Y direction, the first detection distance Da of the photosensitive sensor 20 is long. In the first state, the photosensitive sensor 20 also detects a person away from the image forming device 1. By switching the sensor unit 19 from the first state, the detection distance of the photosensitive sensor 20 changes.

Figure 6:
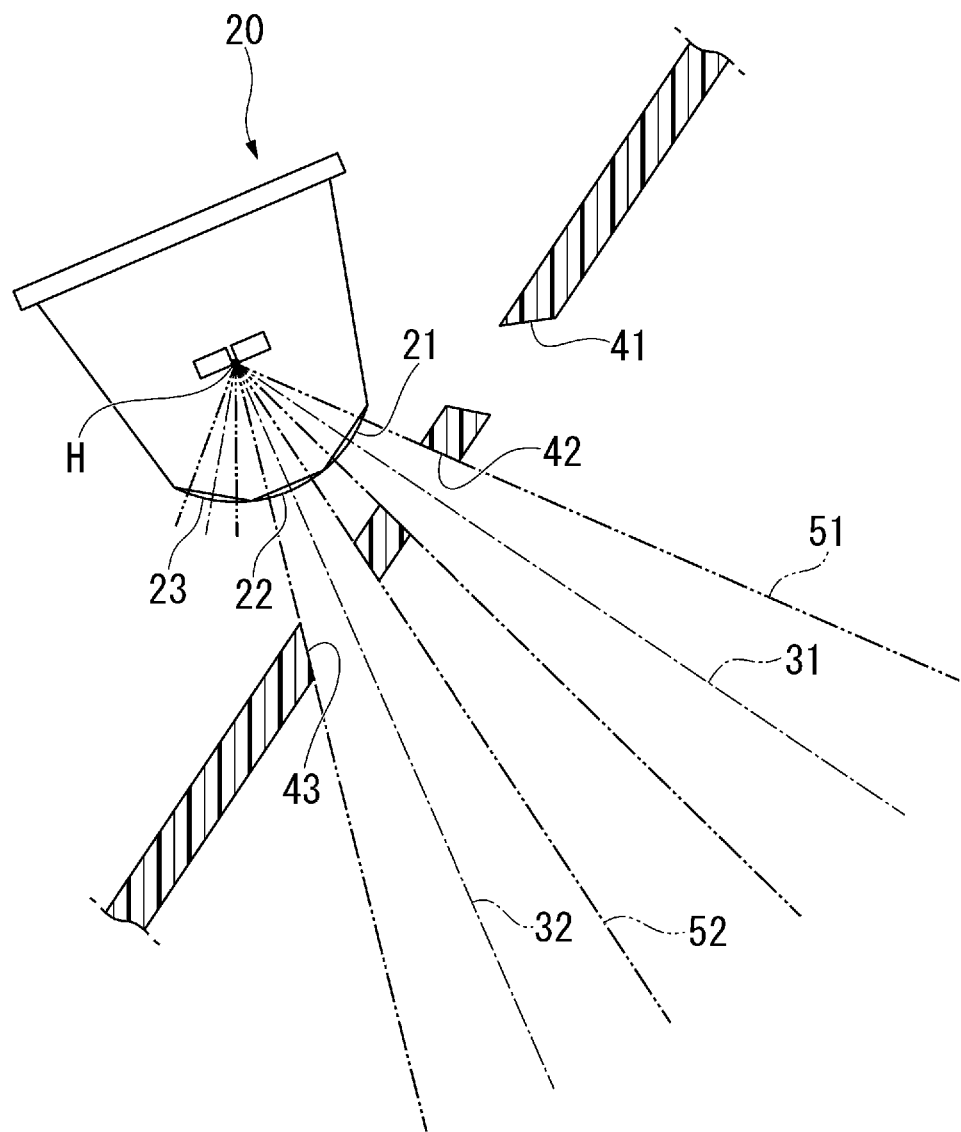
FIG. 6 is a side cross-sectional view of the sensor unit in a second state.
Figure 7:
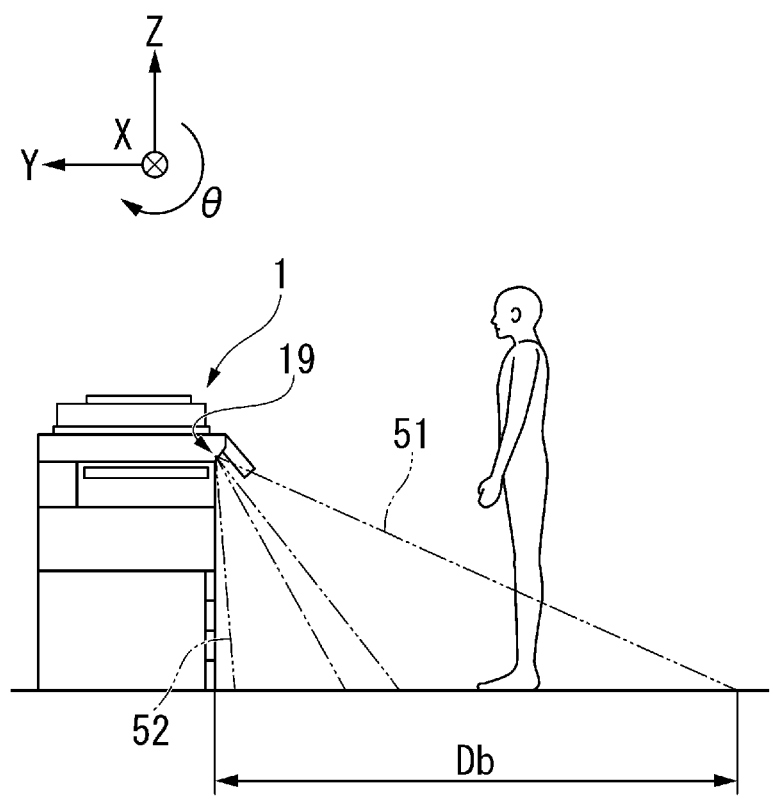
FIG. 7 is an explanatory diagram of a detection range of the sensor unit in the second state.

FIG. 6 is a side cross-sectional view of the sensor unit in the second state. FIG. 7 is an explanatory diagram of the detection range of the sensor unit in a second state. If the lever 49 illustrated in FIG. 1 pivots, the photosensitive sensor 20 pivots to a position of the second state illustrated in FIG. 6. In the second state, the second slit 42 is arranged on the first optical axis 31 and the third slit 43 is arranged on the second optical axis 32. In other words, in the second state, the first optical axis 31 passes through the second slit 42 and the second optical axis 32 passes through the third slit 43. The first optical axis 31 is inclined from the −Y direction to the +θ direction. As illustrated in FIG. 7, the first detection range 51 in the second state is a finite range. In the first detection range 51, the position farthest from the image forming device 1 in the −Y direction is a second detection distance Db of the photosensitive sensor 20. The second detection distance Db in the second state is shorter than the first detection distance Da. If a person is within the range of the second detection distance Db, the photosensitive sensor 20 outputs a detection signal.

In the second state, the second optical axis 32 is inclined from the −Y direction to the +θ direction. The second detection range 52 is closer to the image forming device 1 than the first detection range 51. The photosensitive sensor 20 outputs a detection signal even if a person is within the second detection range 52.

Figure 8:
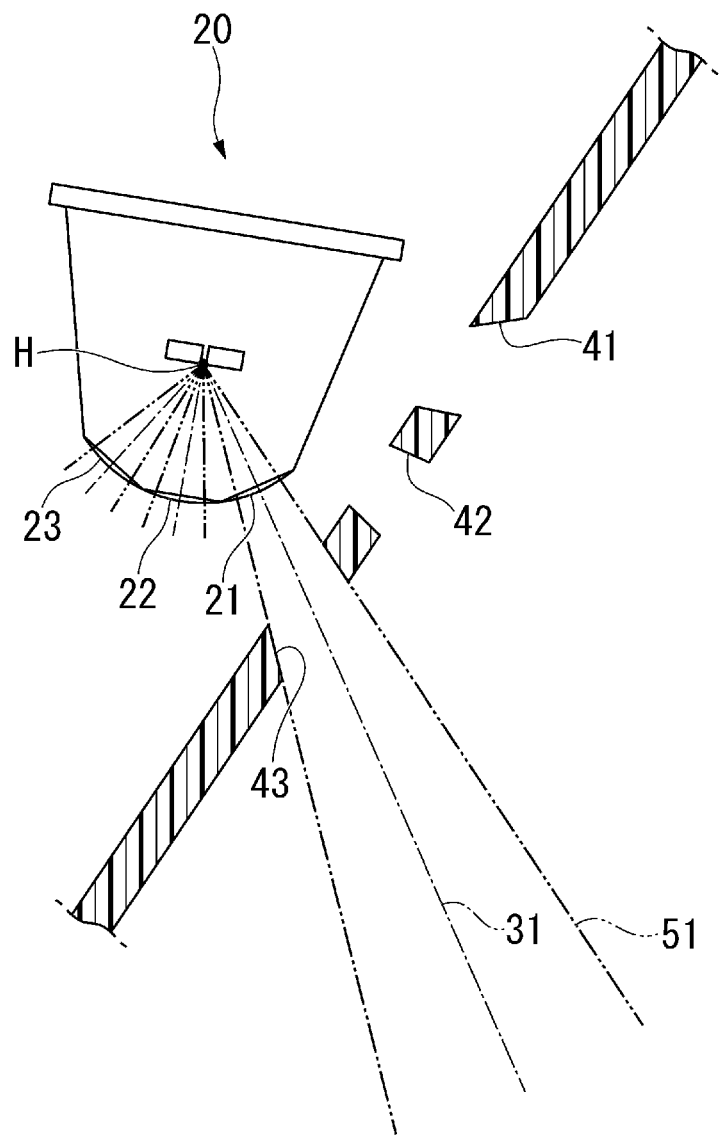
FIG. 8 is a side cross-sectional view of the sensor unit in a third state.
Figure 9:
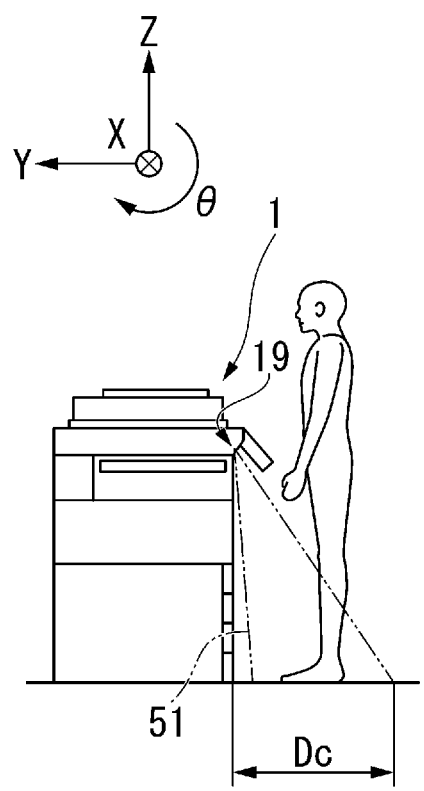
FIG. 9 is an explanatory diagram of a detection range of the sensor unit in the third state.

FIG. 8 is a side cross-sectional view of the sensor unit in a third state. FIG. 9 is an explanatory diagram of the detection range of the sensor unit in the third state. If the lever 49 illustrated in FIG. 1 pivots, the photosensitive sensor 20 pivots to the position of the third state illustrated in FIG. 8. In the third state, the third slit 43 is arranged on the first optical axis 31. In other words, in the third state, the first optical axis 31 passes through the third slit 43. The first optical axis 31 is inclined from the −Y direction to the +θ direction. As illustrated in FIG. 7, the position farthest from the image forming device 1 in the −Y direction within the first detection range 51 is a third detection distance Dc of the photosensitive sensor 20. The third detection distance Dc in the third state is shorter than the first detection distance Da and the second detection distance Db. If a person is within the range of the third detection distance Dc, the photosensitive sensor 20 outputs a detection signal.

As described in detail above, the sensor unit 19 of the embodiment includes the photosensitive sensor 20, the cover 18, and the moving mechanism 48. The photosensitive sensor 20 includes the first lens 21 and the second lens 22 which focus on the photosensitive elements 26 and 27. The cover 18 has the first slit 41 arranged on the first optical axis 31 of the first lens 21 and the second slit 42 arranged on the second optical axis 32 of the second lens 22. The moving mechanism 48 can move the photosensitive sensor 20 so that the second slit 42 is arranged on the first optical axis 31 of the first lens 21.

Since the slits 41 and 42 are elongated, the photosensitive sensor 20 is protected from dirt. Since the incident light rays on the photosensitive sensor 20 pass through the slits 41 and 42, the attenuation of the incident light rays is prevented. Such configurations prevent the decrease in the detection sensitivity of the photosensitive sensor 20. The moving mechanism 48 changes the slit arranged on the first optical axis 31. The detection range of the photosensitive sensor 20 differs depending on whether the first optical axis 31 passes through the first slit 41 or the second slit 42. Such configuration allows the detection range to be adjusted by the photosensitive sensor 20. The detection range can be adjusted with a simple configuration and the cost of the sensor unit is reduced.

The photosensitive sensor 20 further includes the third lens 23. The cover 18 further has the third slit 43 located on the third optical axis 33 of the third lens 23. The moving mechanism 48 can move the photosensitive sensor 20 so that the second slit 42 is arranged on the first optical axis 31 of the first lens 21 and the third slit 43 is arranged on the second optical axis 32 of the second lens 22. The moving mechanism 48 can move the photosensitive sensor 20 so that the third slit 43 is arranged on the first optical axis 31 of the first lens 21.

The moving mechanism 48 changes the slit arranged on the first optical axis 31. The detection range of the photosensitive sensor 20 differs depending on whether the first optical axis 31 passes through the first slit 41, the second slit 42, or the third slit 43. Such configuration allows the detection range of the photosensitive sensor 20 to be adjusted.

The first lens 21, the second lens 22, and the third lens 23 are arranged side by side in the circumferential direction of the horizontal axis H. The moving mechanism 48 is configured to pivot the photosensitive sensor 20 around the horizontal axis H.

By pivoting the photosensitive sensor 20, the detection range can be easily adjusted. The first optical axis 31 is perpendicular to the horizontal axis H. Due to the pivoting of the photosensitive sensor 20, the first optical axis 31 pivots around the horizontal axis H. Such configuration changes the detection range of the photosensitive sensor 20 in the direction of approaching or separating from the horizontal axis H of the photosensitive sensor 20.

The inner surface of the first slit 41 is formed along the angle of view of the first lens 21 arranged so that the first optical axis 31 passes through the first slit 41. The inner surface of the second slit 42 is formed along the angle of view of the second lens 22 arranged so that the second optical axis 32 passes through the second slit 42. The inner surface of the third slit 43 is formed along the angle of view of the third lens 23 arranged so that the third optical axis 33 passes through the third slit 43.

Respective slits 41, 42, and 43 do not limit the angles of view of the lenses 21, 22, and 23. The incident light rays on the photosensitive sensor 20 are not limited by the plurality of slits 41, 42, and 43. Such configuration prevents a decrease in the detection sensitivity of the photosensitive sensor 20.

The image forming device 1 of the embodiment includes the sensor unit 19, the image forming unit 13, and the controller 16. The image forming unit 13 forms an image. The controller 16 controls the power supplied to the image forming unit 13 based on the output signal of the photosensitive sensor 20.

The sensor unit 19 sensitively detects a presence of a person. The sensor unit 19 can adjust the detection range. The controller 16 controls the power supplied to the image forming unit 13 based on the detection of a person by the photosensitive sensor 20. The image forming device 1 can appropriately control the power supplied to the image forming unit 13.

The photosensitive sensor 20 of the embodiment includes three lenses 21, 22, and 23 and the cover 18 has three slits 41, 42, and 43. The numbers of lenses and slits are not limited thereto. The photosensitive sensor 20 may include two lenses, or may include four or more lenses. The cover 18 may have two slits, or may have four or more slits.

The moving mechanism 48 of at least one embodiment pivots the photosensitive sensor 20 in a state where the cover 18 is fixed. The moving mechanism 48 may pivot the cover 18 in a state where the photosensitive sensor 20 is fixed. The moving mechanism 48 may pivot the photosensitive sensor 20 and the cover 18 in opposite directions to each other. The moving mechanism 48 can move the photosensitive sensor 20 and the cover 18 relative to each other. In other words, the moving mechanism 48 is capable of pivoting at least one of the photosensitive sensor 20 or the cover 18.

The image processing device of at least one embodiment is the image forming device 1 and the image processing unit is the image forming unit 13 having the fixing device 14. The image processing device (processor) may be a decoloring device and the image processing unit may be an image decoloring unit including a decoloring portion. The image decoloring unit performs a process of decolorizing the image formed on the sheet with decolorable toner. The decolorizing portion heats and decolorizes the decolorable toner image formed on the sheet passing through a nip.

According to at least one embodiment described above, the sensor unit 19 includes the photosensitive sensor 20 including a plurality of lenses, the cover 18 having a plurality of slits, and the moving mechanism 48 for relatively moving the photosensitive sensor 20 and the cover 18. As a result, it is possible to prevent a decrease in the detection sensitivity of the photosensitive sensor 20 and the detection range can be adjusted.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A sensor apparatus, comprising:
   a pyroelectric sensor including a first lens and a second lens which focus on a photosensitive element;
   a cover having a first slit arranged on an optical axis of the first lens and a second slit arranged on an optical axis of the second lens; and
   a moving mechanism configured to relatively move the pyroelectric sensor and the cover so that the second slit is arranged on the optical axis of the first lens.

2. The apparatus according to claim 1, wherein
   the pyroelectric sensor further includes a third lens,
   the cover further includes a third slit located on an optical axis of the third lens,
   the moving mechanism is configured to move the pyroelectric sensor so that the second slit is arranged on the optical axis of the first lens and the third slit is arranged on the optical axis of the second lens, and
   the moving mechanism is configured to move the pyroelectric sensor so that the third slit is arranged on the optical axis of the first lens.

3. The apparatus according to claim 2, wherein
   the first lens, the second lens, and the third lens are arranged side by side in a circumferential direction of a horizontal axis, and
   the moving mechanism is configured to pivot the pyroelectric sensor around the horizontal axis.

4. The apparatus according to claim 3, wherein the moving mechanism includes a lever configured to pivot the pyroelectric sensor around the horizontal axis.

5. The apparatus according to claim 3, wherein the moving mechanism is configured to pivot the pyroelectric sensor between a first detection state and a second detection state, the first detection state having a greater detection range than the second detection state.

6. The apparatus according to claim 5, wherein the moving mechanism is configured to pivot the pyroelectric sensor between the second detection state and a third detection state, the second detection state having a greater detection range than the third detection state.

7. The apparatus according to claim 2, wherein
   an inner surface of the first slit is formed along an angle of view of the first lens, the inner surface of the first slit arranged so that the optical axis passes through the first slit,
   an inner surface of the second slit is formed along an angle of view of the second lens, the inner surface of the second slit arranged so that the optical axis passes through the second slit, and
   an inner surface of the third slit is formed along an angle of view of the third lens, the inner surface of the third slit arranged so that the optical axis passes through the third slit.

8. The apparatus according to claim 1, wherein the cover has a flat plate shape.

9. The apparatus according to claim 8, wherein a surface of the cover is perpendicular to the optical axis of the pyroelectric sensor.

10. The apparatus according to claim 1, wherein the pyroelectric sensor includes an infrared sensor.

11. The apparatus according to claim 1, wherein the photosensitive element includes two photosensitive elements arranged side by side in a plane perpendicular to the pyroelectric sensor optical axis.

12. The apparatus according to claim 1, wherein the optical axis of the second lens coincide with the pyroelectric sensor optical axis.

13. An image processing device, comprising:
   the sensor apparatus according to claims 1;
   an image processor configured to process an image; and
   a controller configured to control power supplied to the image processor based on an output signal of the pyroelectric sensor.

* * * * *